United States Patent [19]

Streck et al.

[11] Patent Number: 5,023,931
[45] Date of Patent: Jun. 11, 1991

[54] TELEVISION LOCAL WIRELESS TRANSMISSION AND CONTROL

[75] Inventors: Donald A. Streck, 832 Country Dr., Ojai, Calif. 93023; Jerry R. Iggulden, 21600 Cleardale St., Newhall, Calif. 91321

[73] Assignees: Jerry Iggulden, Santa Clarita; Donald Streck, Ojai, both of Calif. ; part interest

[21] Appl. No.: 457,843

[22] Filed: Dec. 27, 1989

Related U.S. Application Data

[62] Division of Ser. No. 96,929, Sep. 15, 1987.

[51] Int. Cl.5 .............................................. H04N 7/00
[52] U.S. Cl. ........................................ 455/21; 455/66; 358/83; 358/335
[58] Field of Search ...................... 455/39, 49, 66, 67, 455/617–619, 9, 20, 21; 358/141, 86, 335, 188, 186, 83

[56] References Cited

U.S. PATENT DOCUMENTS

| | | | |
|---|---|---|---|
| 4,685,133 | 8/1987 | Iggulden | 381/3 |
| 4,697,893 | 10/1987 | Camras | 358/83 |
| 4,739,413 | 4/1988 | Meyer | 358/141 |
| 4,771,344 | 9/1988 | Fallacaro et al. | 358/83 |
| 4,916,532 | 4/1990 | Streck et al. | 455/66 |

*Primary Examiner*—Curtis Kuntz
*Attorney, Agent, or Firm*—Donald A. Streck

[57] ABSTRACT

A wireless local television transmission system with related methods, apparatus, and components. There is a source of a video signal to be viewed at a remote location such as a TV camera, cable select box, antenna, or VCR. An up converter is connected to the source for shifting the video signal to a frequency above the normal television bands. A transmitter is connected to the up converter for transmitting the video signal at the shifted frequency. A receiver is disposed at the remote location for receiving the transmitted video signal. A down converter is connected to the receiver for shifting the video signal back down to a frequency within the normal television bands and identified with a known channel. Finally, conventional television set functions are connected to the down converter for processing and displaying the video signal on the known channel. The preferred up conversion shifts the video signal to a frequency in the band of 902–928 MHz and frequency modulates the video signal on a carrier within that band. Provision is also provided for the wireless transmission of control signals provided by a conventional infra red controller/transmitter so that the controller/transmitter can be used at the location of either the VCR or the television set. The preferred embodiment employs a single controller/transmitter for both VCR and television control. An improved cable select box is disclosed employing two tuners and wireless signal transmission. A wireless video camera/recorder system is also disclosed. The disclosure also includes a universal controller/transmitter transmitting IR and RF signals simultaneously as well as a directional antenna to be employed with receiving equipment to reduce interference.

7 Claims, 14 Drawing Sheets

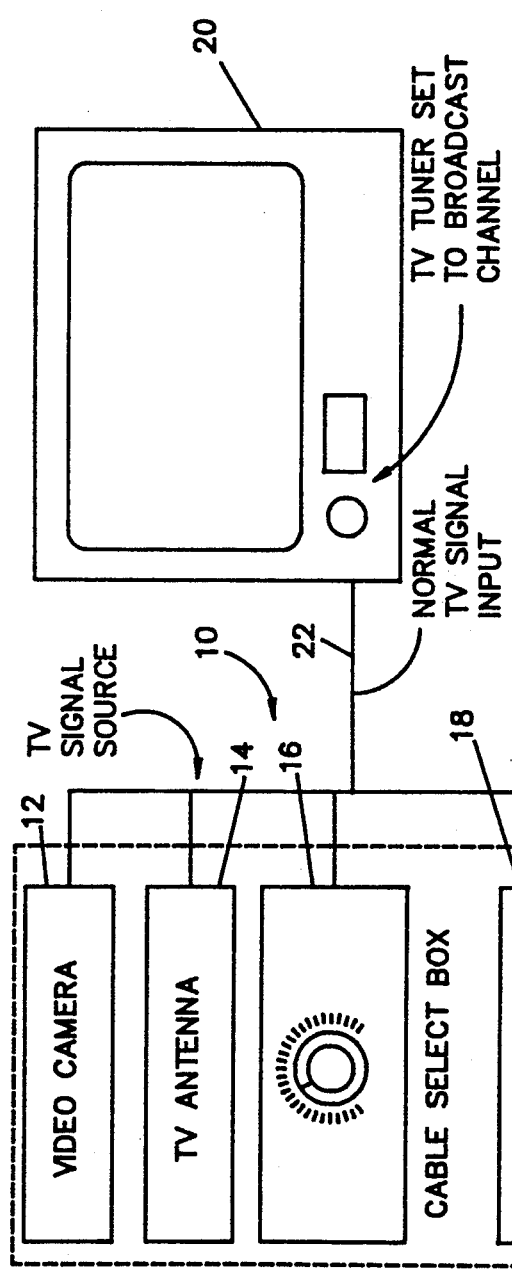
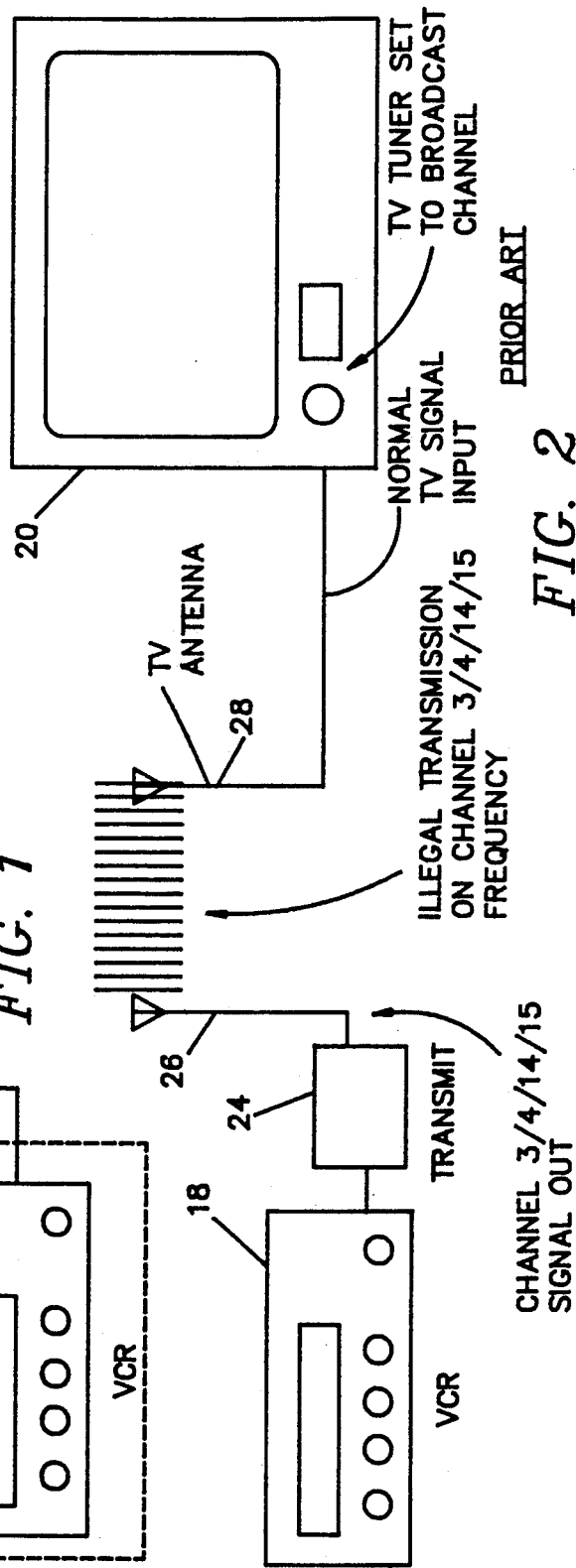

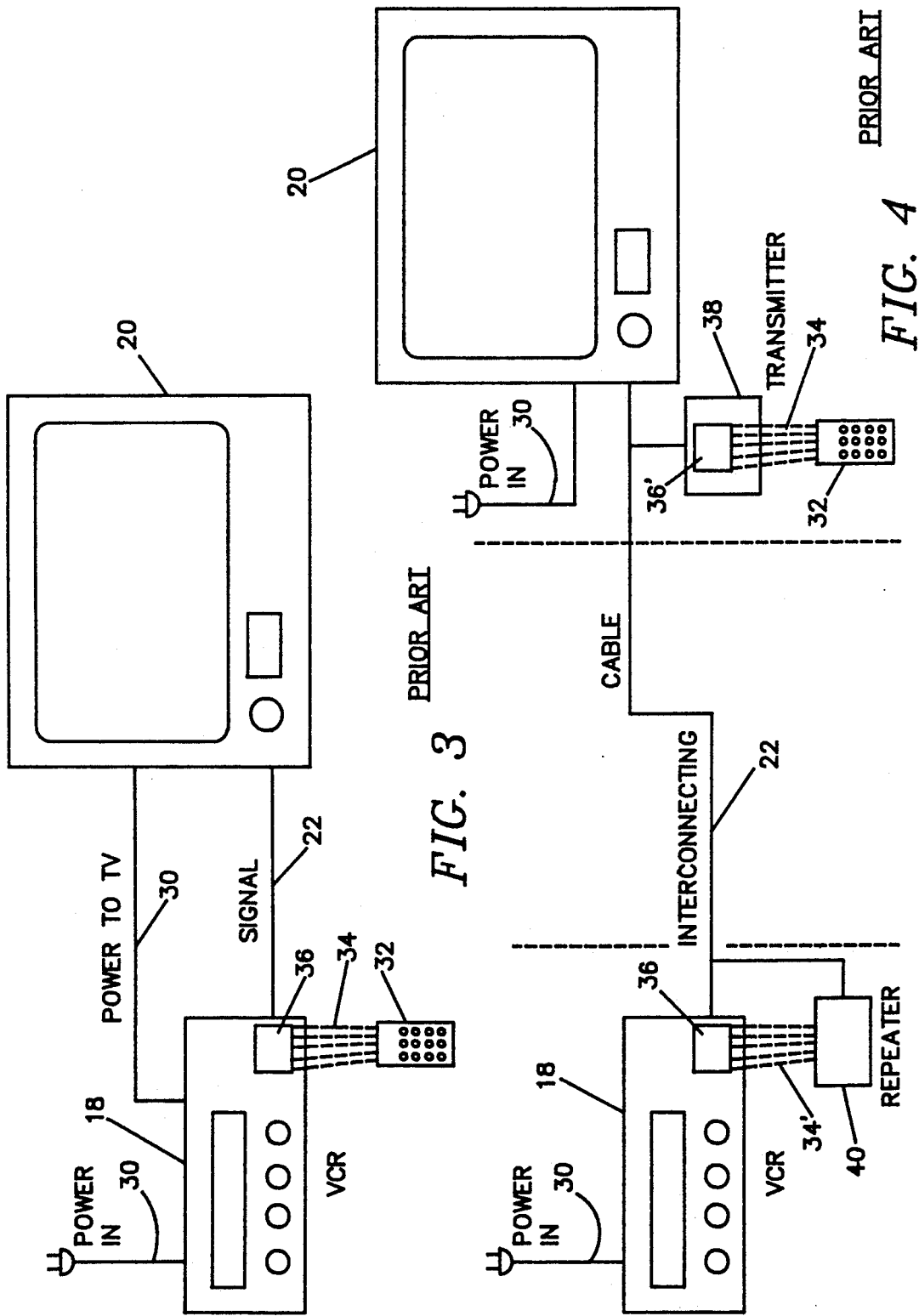

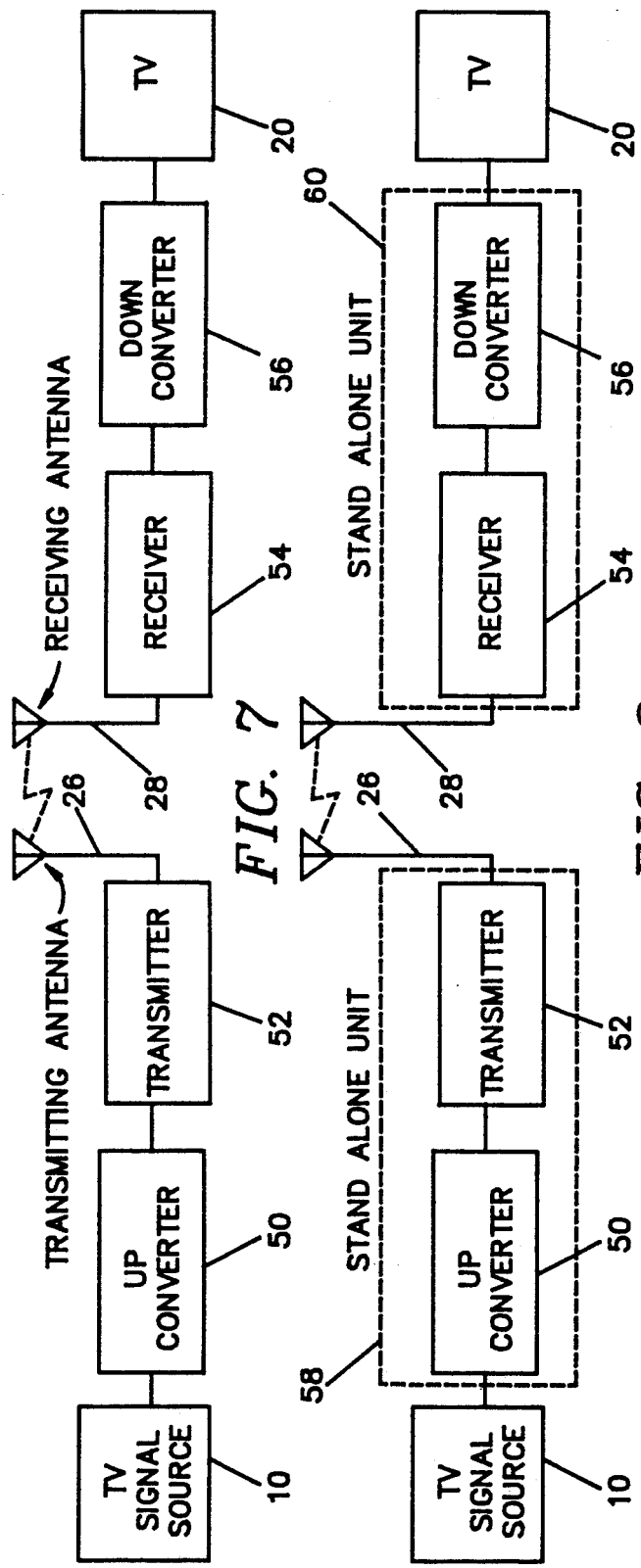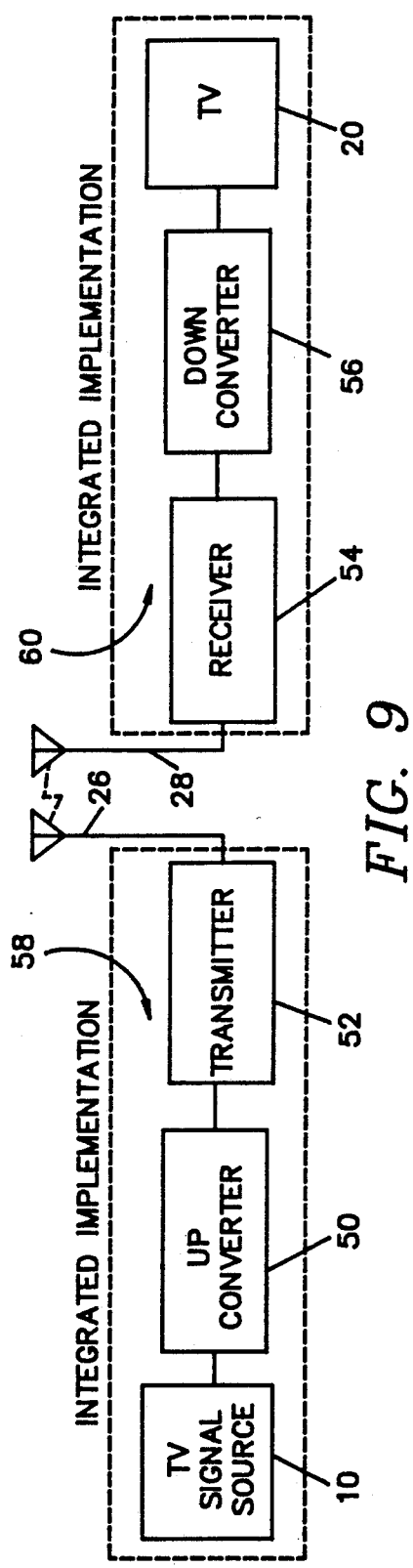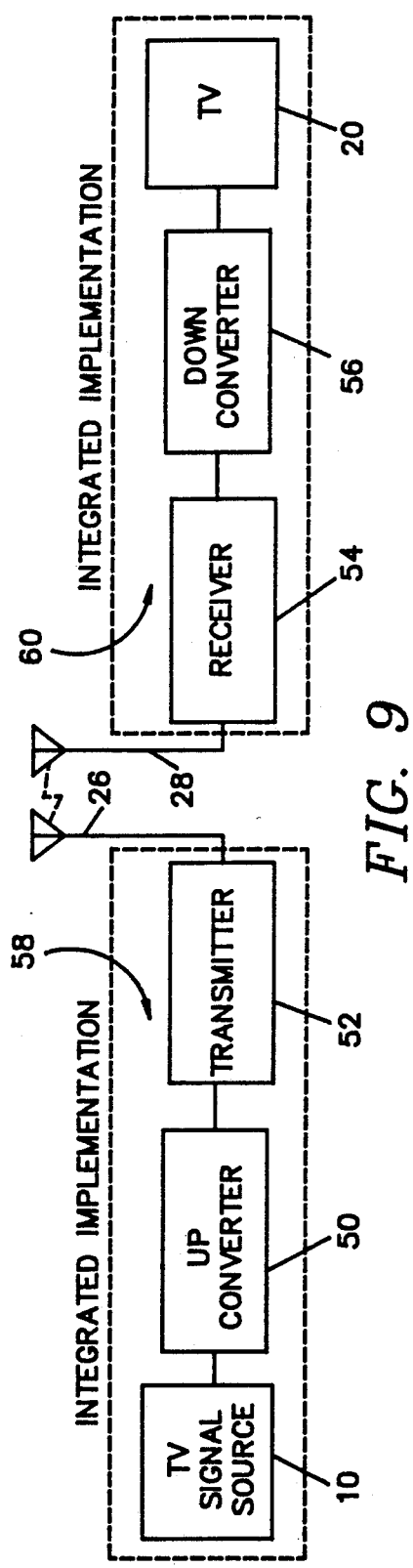

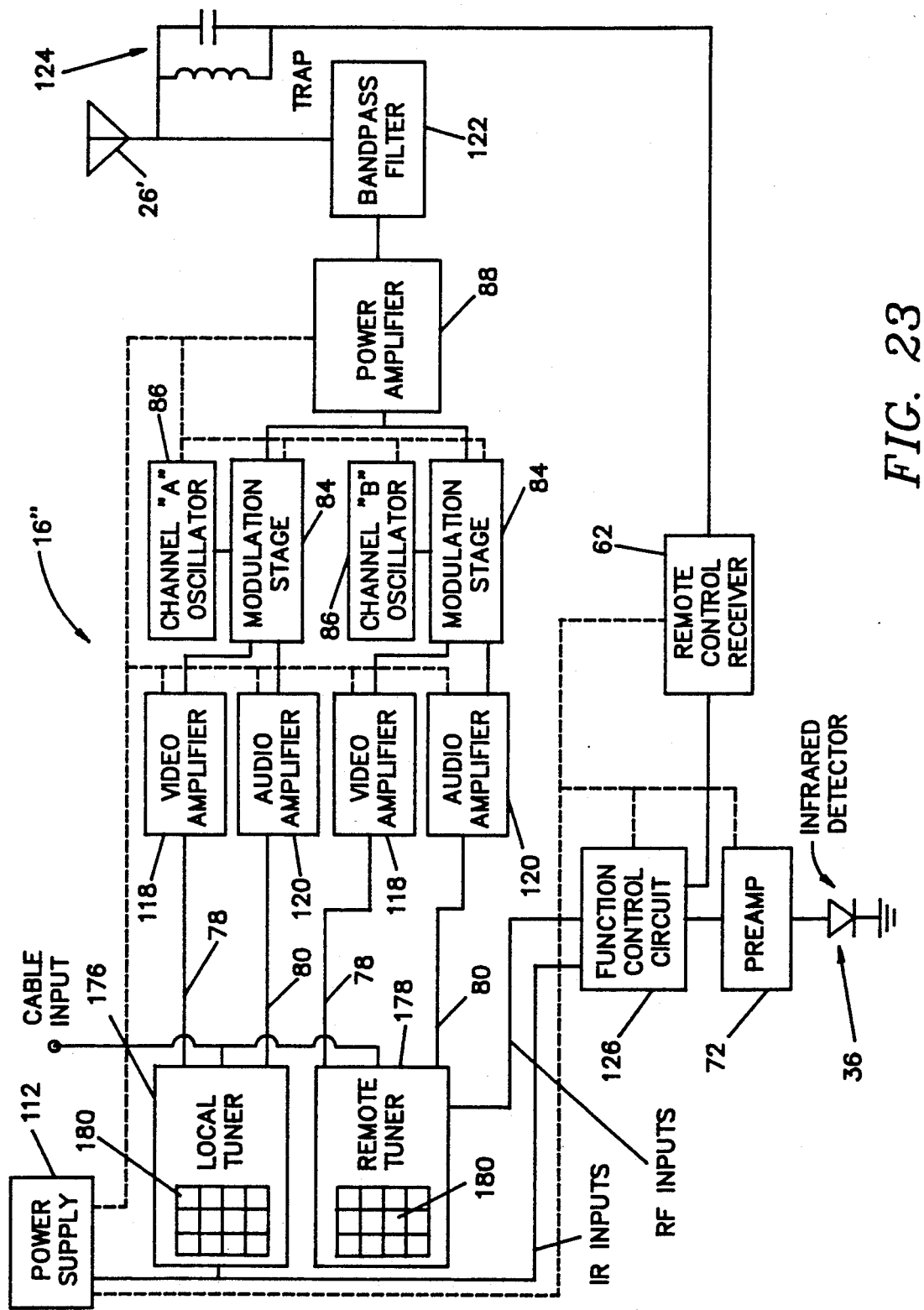

TELEVISION LOCAL WIRELESS TRANSMISSION AND CONTROL

This application is a division of application Ser. No. 096,929, filed Sept. 15, 1987.

BACKGROUND OF THE INVENTION

The present invention relates to local television transmission and, more particularly, to a wireless local television transmission system comprising, a source of a video signal to be viewed at a remote location; up converter means connected to the source for shifting the video signal to a frequency above the normal television bands; transmitter means connected to the up converter means for transmitting the video signal at the shifted frequency; receiver means at the remote location for receiving the transmitted video signal; down converter means connected to the receiver means for shifting the video signal back to a frequency within the normal television bands and identified with a known channel; and, television set means connected to the down converter for processing and displaying the video signal on the known channel.

Television (TV) is a major factor in everyday life throughout much of the world. Unfortunately, the rapid advances in the art relative to devices for producing the television signals that drive the TV sets has not provided a convenient method of connecting those devices. All this is to say that television technology quickly outstripped interconnecting technology resulting, quite literally, in a mess. The typical home has at least one video cassette recorder (VCR) and, probably, two TV sets. Cable has generally replaced the old antenna on the roof; so, there is probably a cable select box as well. All these are usually interconnected with so-called co-axial cable or "co-ax". The co-ax is stiff and cumbersome. If the viewer wants to have the ability to watch one station while recording another, quite often a so-called "A-B switch" must be employed, particularly where scrambled pay channels are being unscrambled within the cable select box. The result is a tangled web of co-axial cable connected between signal splitters, A-B switches, cable select boxes, VCRs and TV sets.

Where it has been desired to have a single VCR and/or cable select box provide signals to TV sets in separated rooms, the co-ax has been run through the walls, attics, along baseboards, or what have you, to make the necessary interconnections. In one recent commercial prior art attempt to overcome the problem, fine double stranded wire has been substituted for the unwieldy co-ax. The use of an ordinary pair of wires in place of the co-ax is also addressed in Choy et al U.S. Pat. No. 4,054,910. The Karplus U.S. Pat. No. 3,093,706 suggests transmitting the TV signal over the power lines. Since the latter patent is over twenty years old and the use of power lines to replace co-ax has not been adopted, it would appear that the teaching did not produce acceptable results.

Some of the basic problems presented and some prior art attempts at their solution are depicted in FIGS. 1–6. The basic problem is depicted in FIG. 1; that is, some one or more TV signal sources 10 (e.g. video camera 12, TV antenna 14, cable select box 16 or VCR 18) must be connected to the TV set 20. The typical method is co-axial cable 22 with signal splitters and A-B switches (not shown), as necessary for the particular hook-up. Devices such as the cable select box 16 and VCR 18 typically output their signal at the frequency and in the manner of a normal TV signal from channel 3 or 4 (although other normal channels can be, and have been, used). The input to the TV set 20 is at its normal signal input terminals and the tuner of the set 20 is tuned to the appropriate channel (3, 4, etc.) to receive the signal in the normal manner.

In an effort to eliminate the interconnecting wires, some illegal efforts have been made to wirelessly transmit the combined video/audio signal from the VCR 18 in the manner shown in FIG. 2. This approach is also employed in commercially available devices in Japan (where it is not illegal) employing UHF television channel frequencies. The audio and video signals developed by the VCR 18 from the cassette being played (not shown) are input to a transmitter 24 which is set up to transmit with a low power signal from antenna 26 on a channel normally not used commercially in the local area, such as channel 3 or 4 as mentioned above (with channels 14 and 15 sometimes being used). The TV set 20 then picks up the transmitted signal over its normal "rabbit ears" antenna 28. This, of course, is an illegal transmission at a licensed frequency in the United States and can, and has, gotten the manufacturers and sellers of such devices in serious trouble with the Federal Communications Commission.

One very common prior art arrangement for cutting down on the number of cables and wires required is shown in FIG. 3. The typical VCR 18 has a power outlet (not shown) on the back of the case into which the power cord 30 of the TV set can be plugged instead of having to run two power cords to a wall outlet. Often, the power outlet of the VCR 18 is controlled by the VCR 18 so that to turn on both the VCR 18 and TV set 20, only the VCR 18 needs to be turned on. Commonly, the VCR 18 can be controlled in all its functions by an infra red (IR) transmitting controller 32 which also eliminates wires and cables. The controller 32 emits a coded beam of IR energy 34 which is detected by an IR detector 36 on the front of the VCR 18. Which brings us to the prior art improvement to such systems depicted in FIG. 4. The transmitting controller 32 must be within a limited distance of the detector 36 and must be able to have the IR energy 34 therefrom directed onto the detector 36. Thus, if the VCR 18 and TV set 20 are remotely located from one another, the transmitting controller 32 is useless at the location of the TV set 20 where the viewer is located. To solve this problem, Robbins U.S. Pat. No. 4,509,211 teaches the use of a transmitter 38 having an IR detector 36' therein which detects the coded beam of IR energy 34 from the transmitting controller 32 and transmits the signal as an electrical signal on the interconnecting co-axial cable 22 between the VCR 18 and TV set 20 to a repeater 40 which uses the electrical signal to produce a duplicate coded beam of IR energy 34' which is directed on the detector 36 of the VCR 18 to operate it remotely.

For the operation of multiple TV sets 20 located throughout a plurality of rooms such as in a hotel or apartment building, the Parker U.S. Pat. No. 2,628,275 suggests the arrangement shown in simplified form in FIG. 5. A transmitter 42 takes the received TV signals and retransmits them on an antenna wire 44 disposed in the baseboard of the rooms throughout the building. The antenna wire 44 is in lieu of co-axial cable 22 with splitters at each room location and cable 22 piercing the walls at each location to provide connection thereto. Each TV set 20 is provided with an antenna 28' disposed along the baseboard in close spaced relationship to the antenna wire 44 causing the signal in the wire 44 to be inductively coupled into the antenna 28'.

Finally, as depicted in FIG. 6, it is well known to wirelessly transmit the audio portions of the TV signal from an audio transmitter 46 to a local speaker 48 located where the viewer sits to provide privacy in viewing television; that is, one viewing and listening to the TV set 20 by means of the local speaker 46 does not disturb someone else in the room or house. Such devices are exemplified by the patents of Sienkiewicz U.S. Pat. No. (3,259,689 and Trask U.S. Pat. No. 4,021,737; the latter patent being directed more to providing high fidelity sound than to privacy.

Wherefore, it is the object of the present invention to provide a method and apparatus for the wireless local broadcasting of video signals in a broad spectrum of applications which eliminates the necessity for any kind of physical interconnections, is legal, and which provides a high quality signal.

It is another object of the present invention to provide a method and apparatus for the wireless local broadcasting of control signals associated with wirelessly broadcast video signals.

It is yet another object of the present invention to provide a method and apparatus for combining control signals for multiple associated video devices into a single device so as to eliminate the necessity of having multiple controllers.

Other objects and benefits of the present invention will become apparent from the description which follows hereinafter taken in combination with the drawing figures which accompany it.

Summary

The foregoing objects have been attained in the wireless local television transmission system of the present invention comprising, a source of a video signal to be viewed at a remote location; up converter means connected to the source for shifting the video signal to a frequency above the normal television bands; transmitter means connected to the up converter means for transmitting the video signal at the shifted frequency; receiver means at the remote location for receiving the transmitted video signal; down converter means connected to the receiver means for shifting the video signal back down to a frequency within the normal television bands and identified with a known channel; and, television set means connected to the down converter for processing and displaying the video signal on the known channel.

In the preferred embodiment, the up converter means shifts the video signal to a frequency band above 900 MHz and, more particularly, to a frequency within the band 902-928 MHz. Additionally in the preferred embodiment, the up converter means frequency modulates the video signal on a carrier within that band.

Further with respect to the preferred embodiment, the source of the signal including a video portion also includes a control system responding to coded infra red energy from a controller/transmitter striking a detector to produce a coded electrical output and the present invention additionally comprises supplemental detector means located at the television monitor for detecting the coded infra red energy from the controller/transmitter and for translating it into a coded electrical signal; remote control transmitter means connected to receive the electrical signal for transmitting the coded electrical signal at a frequency allocated to the transmission of binary coded information; remote control receiver means located at the source of the signal including a video portion for receiving the transmitted electrical signal and for recreating the coded electrical signal therefrom; and, means connected to the receiver means for inputting the coded electrical signal into the control system.

DESCRIPTION OF THE DRAWINGS

FIG. 1 is a simplified block diagram showing the various devices that are usually connected to a television set by wire according to the prior art.

FIG. 2 is a simplified block diagram of illegal prior art attempts to transmit television signals from a VCR, or the like, to a television set wirelessly.

FIG. 3 is a simplified block diagram of a prior art VCR employing an infra red control transmitter which is connected by wires to a television set for both signal and power control.

FIG. 4 is a simplified block diagram of a prior art repeater system whereby a local transmitter responds to the infra red signals from a control transmitter and sends those signals over the same cable interconnecting the television set to a remotely located VCR where they are used to drive a repeater placed in front of the infra red detector of the VCR.

FIG. 7 is a simplified block diagram of one embodiment of the present invention without control feedback.

FIG. 8 is a simplified block diagram of a second embodiment of the present invention without control feedback.

FIG. 9 is a simplified block diagram of a third embodiment of the present invention without control feedback.

FIG. 23 is a simplified block diagram of a cable select box according to the present invention in a second embodiment containing two tuners and dual channel wireless transmission.

DESCRIPTION OF THE PREFERRED EMBODIMENTS

Figure 5:
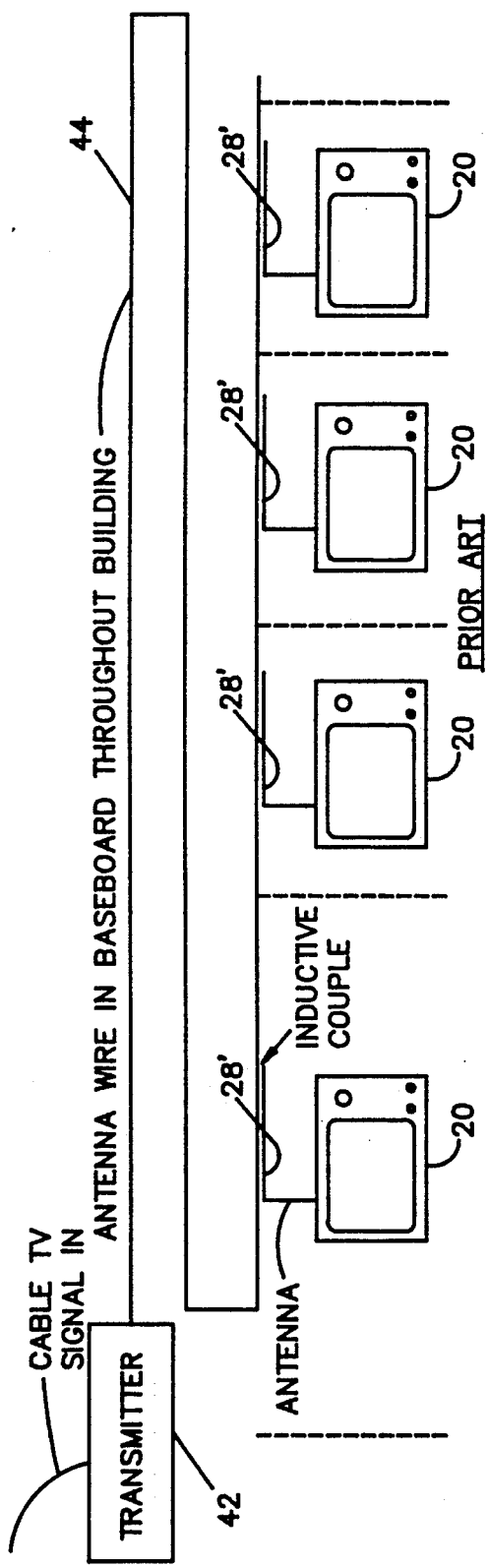
FIG. 5 is a simplified block diagram of a prior art system proposed for use in hotels, apartment buildings, etc. wherein an antenna is run through the baseboards in the rooms and the television sets pickup their signal through inductive coupling to the antenna.
Figure 6:
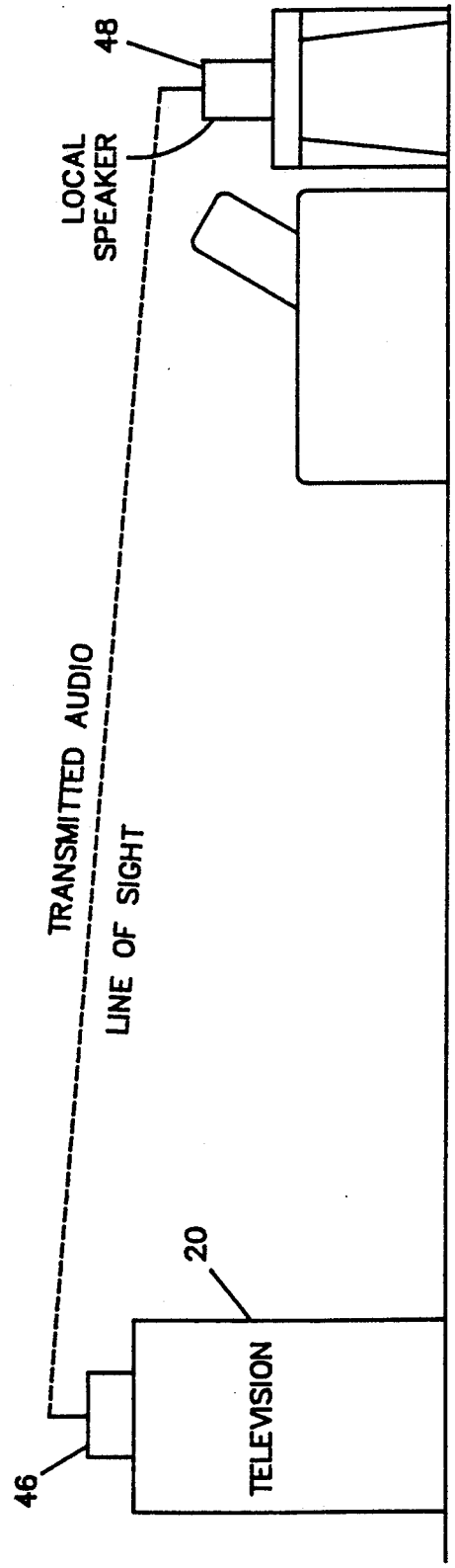
FIG. 6 is a simplified block diagram of a prior art technique for wirelessly broadcasting the audio portion of a received television signal to a local speaker placed near the viewer's chair.

The present invention provides its benefits across a broad spectrum of video applications. While the description which follows hereinafter is meant to be representative of a number of such applications, it is not exhaustive. As those skilled in the art will recognize, the basic methods and apparatus taught herein can be readily adapted to many uses. It is applicants' intent that this application and the claims appended hereto be accorded a breadth in keeping with the scope and spirit of the invention being disclosed despite what might appear to be limiting language imposed by the requirement of referring to the specific examples disclosed It should also be noted that while the audio portions of the TV signal are addressed from time to time hereinafter with relationship to novel aspects of the present invention, the wireless local transmission of audio signals, per se, is known in the art and the present invention is primarily directed to the wireless local broadcasting of video which, until the present invention, has defied those skilled in the art despite the long felt desire and need for such capability.

The very basic approach of the present invention with respect to the wireless transmission of video is shown in FIG. 7. The signal from a TV signal source 10, such as those discussed with respect to FIG. 1, is input to an up converter 50 wherein it is shifted in frequency to a legal frequency for the transmission of video information located outside of and far above the normal television channels. It is presently contemplated that such frequency will fall into the band from 902 MHz to 928 MHz. After the frequency of the signal is shifted upwards in the up converter 50, it is broadcast via the local transmitting antenna 26 by the power transmitter 52. On the receiving end, there is a separate receiver 54 (instead of direct reception by the TV set 20 as in the prior art) which receives the high frequency locally broadcast signal via receiving antenna 28 and inputs it to a down converter 56 wherein it is shifted downward in frequency back into the normal television band and an assigned channel frequency. The normal TV signal as reconstituted by the down converter 56 is then input to the TV set 20 for normal processing.

It is envisioned by the applicants that the above described basic approach to local wireless video transmission and reception will be accomplished in two ways—which can be combined as necessary and convenient for different applications. As shown in FIG. 8, it is contemplated that the local transmitter, generally indicated by the dashed box 58, and the local receiver, generally indicated by the dashed box 60, can be stand alone units. That is, for use with existing VCRs 18, TV sets 20, and the like, a stand alone local transmitter and/or receiver 58, 60 can be employed by simply connecting them to the associated devices. As the technology of the present invention is accepted and new devices are produced, it is envisioned by the applicants that the integrated implementation depicted in FIG. 9 will be employed wherein the local transmitter 58 and local receiver 60 are incorporated into the devices themselves in order to take advantage of commonly usable components such as power supplies, etc.

Figure 10:
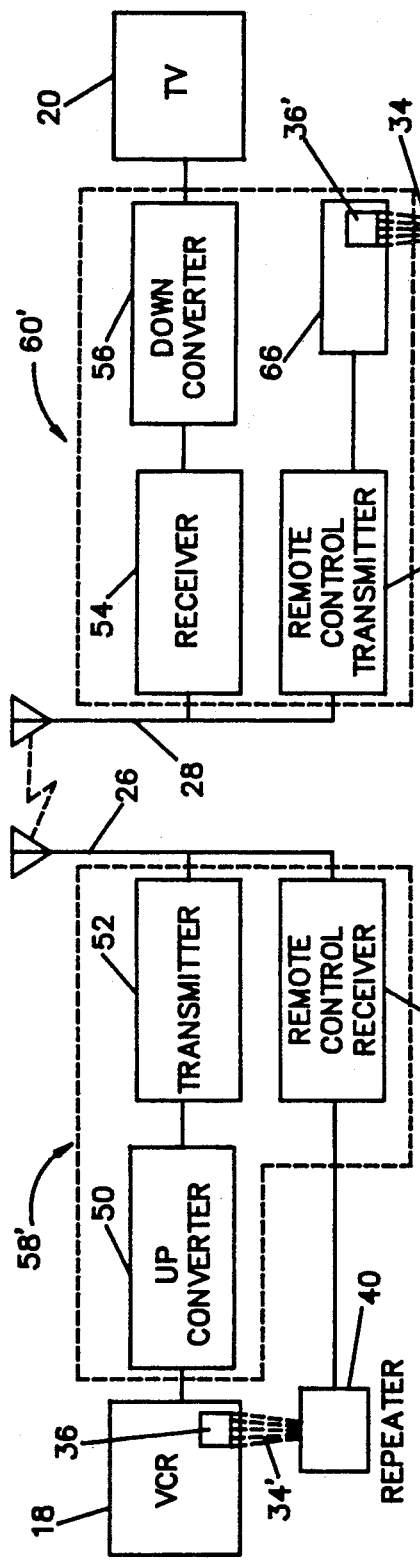
FIG. 10 is a simplified block diagram of one embodiment of the present invention with control feedback.
Figure 11:
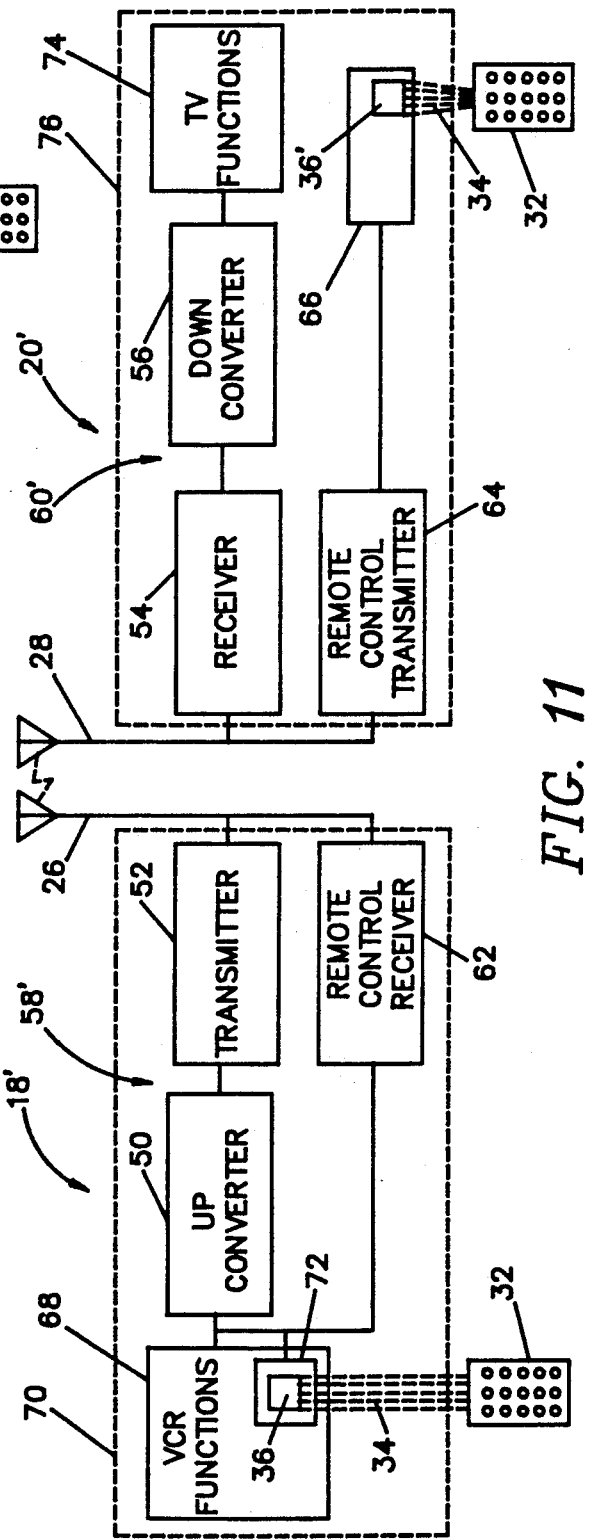
FIG. 11 is a simplified block diagram of a second embodiment of the present invention with control feedback.

In the preferred method and apparatus for use with a VCR/TV set combination, the IR transmitting controller 32 is also provided for so that the viewer at a remote location has full wireless control of the VCR 18 in another location. As with the basic approach of FIG. 7 which had stand alone and integrated configurations as shown in FIGS. 8 and 9, the expanded basic approach combining the controller 32 therein is also anticipated to be available in stand alone and integrated configurations as shown in FIGS. 10 and 11. In the stand alone configuration of FIG. 10, the local transmitter 58' once again contains the up converter 50 and power transmitter 52. Additionally, however, there is a remote control receiver 62 also connected to the antenna 26. The remote control receiver 62 is connected to drive an IR repeater 40' with an electrical signal reflecting the IR signal 34 from the transmitting controller 32 in the manner of the prior art repeater 40 discussed above. In similar manner, the local receiver 60' once again contains the receiver 54 and the down converter 56. Additionally, however, there is a remote control transmitter 64 connected to broadcast via the antenna 28. The remote control transmitter 64 receives its input from a detector circuit 66 having an IR detector 36' therein for detecting the IR energy 34 from the controller 32. The coded signal from the controller 32 is translated into an electrical coded signal which is then transmitted by the remote control transmitter 64 to the remote control receiver 62. It is anticipated by the applicants that the transmitter/receiver 64, 62 will operate on one of the frequencies provided for the local transmission of coded information such as those employed with garage door openers, and the like. It is also contemplated by applicants that the transmitter/receiver 64, 62 will, most likely, include logic for appending additional changeable coded information on the signal sent between them which can be employed to prevent interference between the use of the controller 32 remotely and garage door openers, etc. in the area which might be affected thereby, and vice versa. It is also worthy of note that the approach of a single IR controller/transmitter for multiple devices as is part of the present invention could also be employed with multiple devices without wireless transmission if unique signals were recognized in each device. In such instance, as well as with the wireless transmission, the additional changeable coded information would also prevent interference from other IR operated devices in the area.

In the integrated versions of a VCR 18' and a TV set 20' as shown in FIG. 11, the VCR functions 68 and local transmitter 58' are contained within a common case, as indicated by the dashed line 70, and share common components as applicable. The output of the remote control receiver 62 is connected to the preamplifier 72 of the IR detector 36 so that the VCR 18' can be operated both locally and remotely with the same transmitting controller 32. Similarly, the TV functions 74 and local receiver 60' share common components and a common case as indicated by the dashed line 76.

Figure 12:
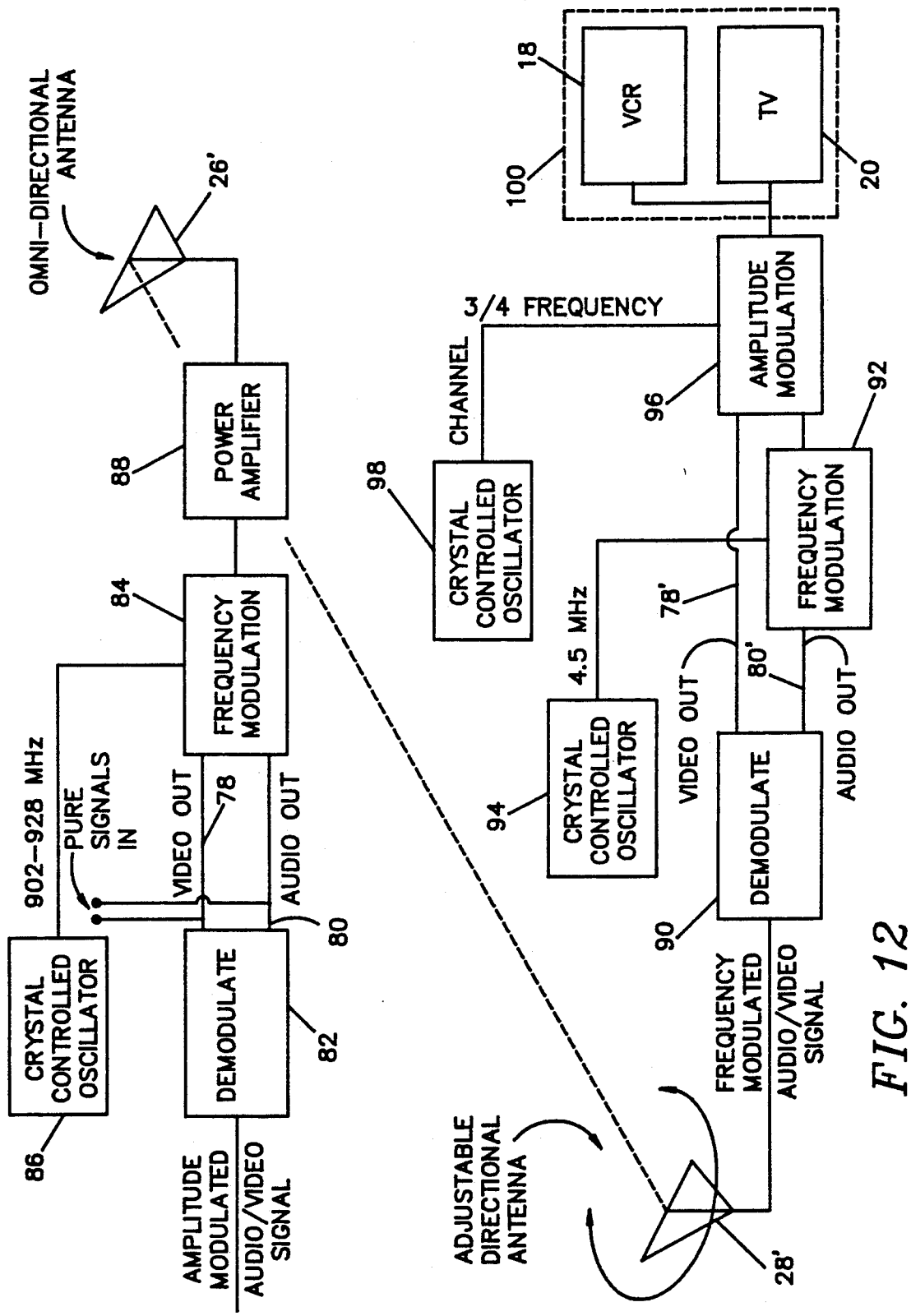
FIG. 12 is a more detailed block diagram of one manner of preferred operation of the present invention wherein the wireless local transmission of the television signal is accomplished employing a frequency modulated signal.

Turning now to FIG. 12, the preferred method and mode of operation of the present invention to reduce the chance of interference between similar systems in an area (as from neighboring house to house) is shown. The normal TV video signal is broadcast as an amplitude modulated (AM) signal with the audio portions frequency modulated (FM). In the present invention according to its preferred method of operation, pure video and audio signals 78 and 80 are obtained by a demodulator 82. If available from the source as in the case of some VCRs, the pure signals can be employed directly as indicated in the figure. In either event, the video and audio signals 78, 80 are input to a frequency modulator 84 connected to a crystal controlled oscillator 86 providing the carrier signal in the 902–928 MHz band which is the preferred signal band for the present invention. The FM signal from the modulator 84 containing the video and audio information is transmitted by power amplifier 88 via the omni-directional antenna 26'.

The user end is preferably provided with an adjustable, directional antenna 28' for maximum unwanted signal rejection capability so as to minimize the possibility of interference from and with other signal sources in the area. The FM signal as received is demodulated by the demodulator 90 to reproduce the pure video and audio signals 78', 80'. The pure audio signal 80' is frequency modulated in modulator 92 with a 4.5 MHz carrier signal from the crystal controlled oscillator 94 to reproduce the expected audio signal portion of the resultant TV signal to be generated for use. The output from the modulator 92 is then amplitude modulated along with the video signal 78' in modulator 96 with a carrier signal from the crystal controlled oscillator 98 which is operating at a selected frequency in the normal TV band, such as channel 3 or 4 as commonly employed in such devices. The reconstituted TV signal can then be employed with a normal user device, generally indicated as 100, such as a VCR 18 (recording function) or TV set 20.

Figure 13:
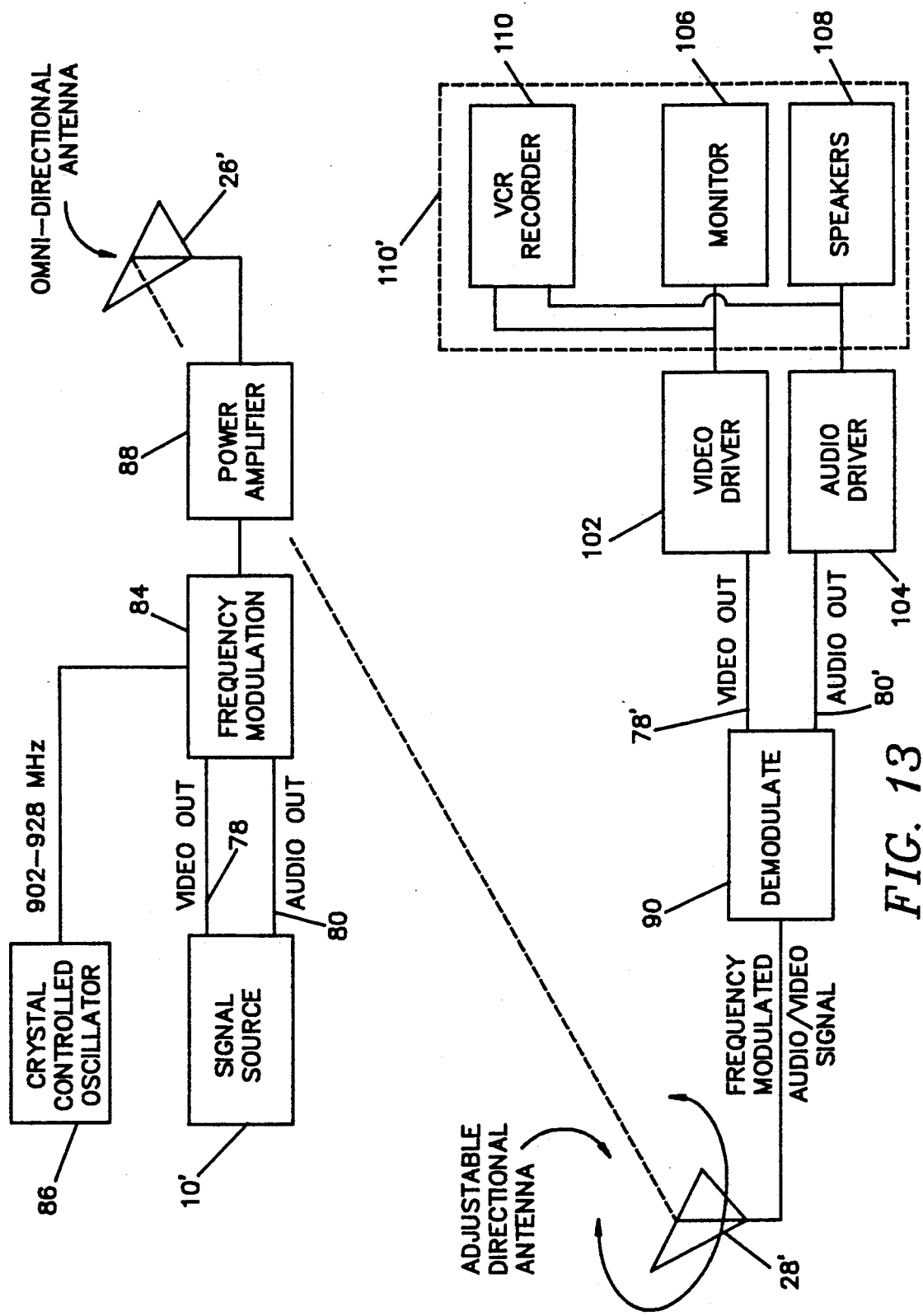
FIG. 13 is a more detailed block diagram of another manner of preferred operation of the present invention wherein the wireless local transmission of the television signal is accomplished employing a frequency modulated signal.

A fully integrated implementation of the method and apparatus of FIG. 12 is shown in FIG. 13. Note that the components are greatly simplified through integration. The signal source 10' (e.g. VCR functions) need only produce the pure video and audio signals 78, 80 which are FM modulated by modulator 84 with the same carrier frequency in the preferred 902–928 MHz band from the oscillator 86 as in the prior example of FIG. 12. The same power amplifier 88 and omni-directional antenna 26' are also used. On the receiving end, the FM signal is again received by the preferred adjustable, directional antenna 28' and demodulated by demodulator 90 to reproduce the video and audio signals 78', 80'. In this instance, however, the pure signals 78', 80' are fed into a video and audio driver, 102, 104, respectively, the outputs of which are employed to drive the user devices 100' such a monitor 106 and speakers 108 to produce a TV output or as inputs to a VCR recorder 110 requiring only the pure video and audio signals (i.e. without a TV tuner built in).

Figure 14:
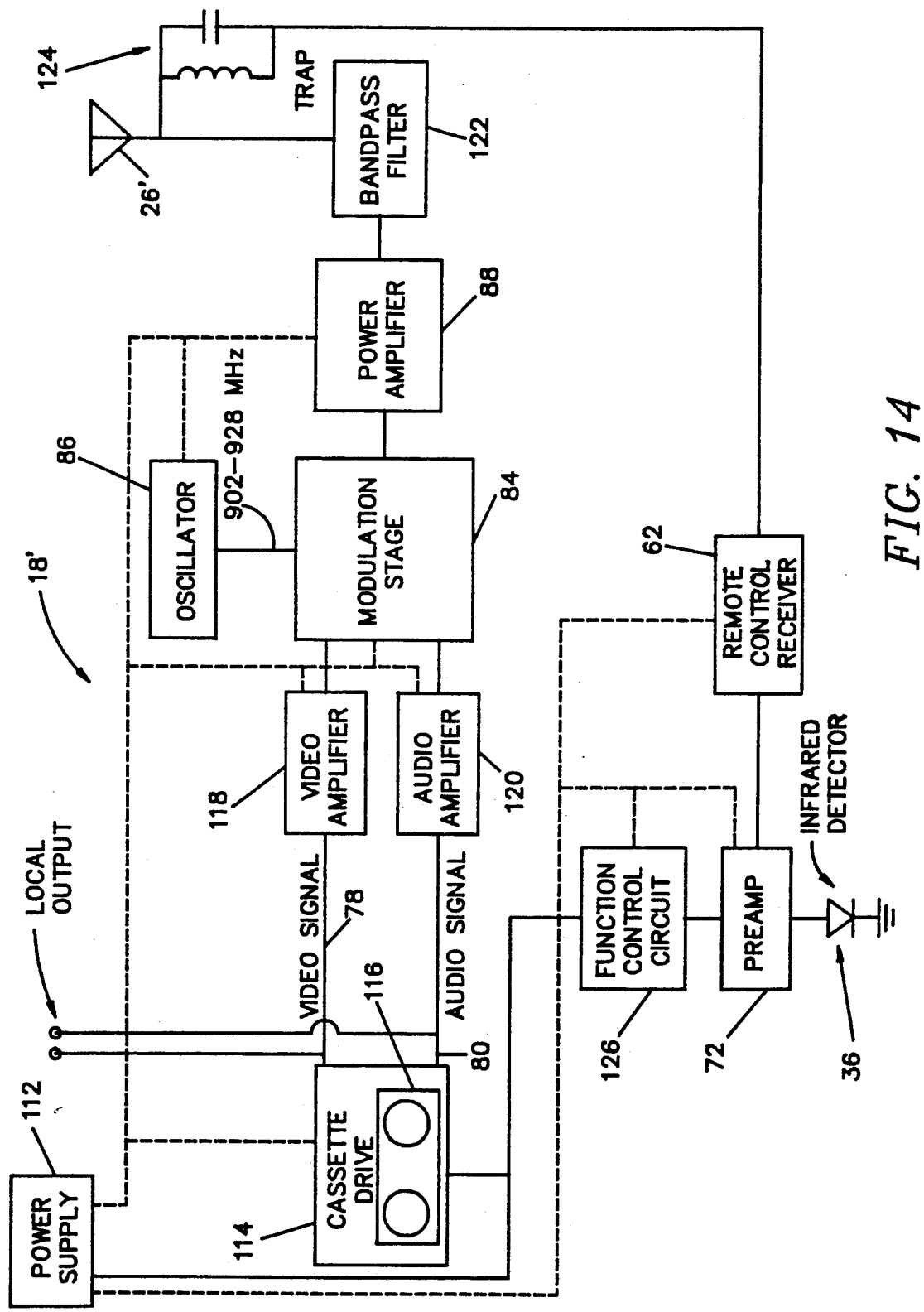
FIG. 14 is a more detailed block diagram of a preferred VCR construction according to the present invention.

A preferred configuration for a fully integrated VCR 18' is shown in a more detailed block diagram in FIG. 14. It should be noted at this point if not already apparent, as with the rest of this specification and the appended drawings, the individual components shown by way of block diagram are either well known or could be easily produced by those skilled in the art without undue experimentation and, therefore, in the interest of simplicity and to eliminate redundancy, the descriptions contained herein of the various circuits and apparatus are only shown to the block diagram level. As with the more general block diagram of FIG. 11, the VCR 18' of FIG. 14 has all its components located within a single case (not shown for convenience). A single power supply 112 is employed for all the circuits and electrically driven components as indicated by the dashed lines. A cassette drive 114 is provided to releasably accept and play a video cassette 116 to produce the pure video and audio signals 78, 80 which are input to a video amplifier 118 and an audio amplifier 120, respectively. The outputs from the amplifiers 118, 120 are input to modulator 84 along with the preferred 902–928 MHz band carrier signal from the oscillator 86. The FM signal from the modulator 84 is fed into power amplifier 88 and from thence through a bandpass filter 122 to the omni-directional antenna 26'. The remote control receiver 62 which was discussed earlier is also connected to the antenna 26' through trap 124 so as to receive control signals therefrom. The trap 124 and bandpass filter 122 assure that the video/audio FM signals being broadcast and the control signals being received through the common antenna 26' are properly directed and filtered of unwanted signal components. Again as previously mentioned, the remote control receiver 62 is connected to the preamplifier 72 as one input thereof with the IR detector 36 providing the other input thereof. The output from the preamplifier 72 provides the control signal input to the function control circuit 126 which, in turn, is connected to control the power supply 112 (i.e. turn the set off and on remotely) and the cassette drive 114 (e.g. to provide direction and speed control commands).

Figure 15:
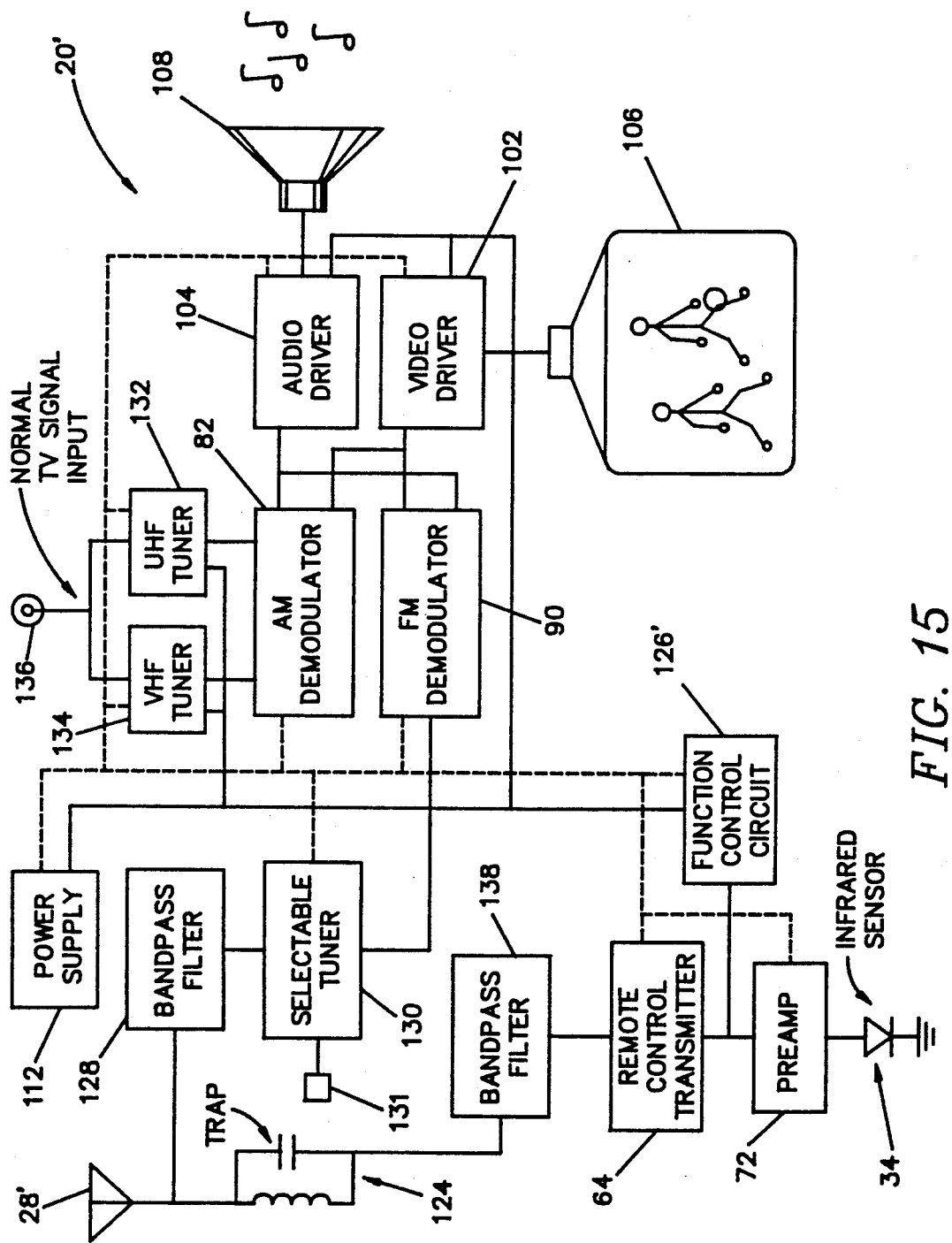
FIG. 15 is a more detailed block diagram of a preferred television set construction according to the present invention.
Figure 19:
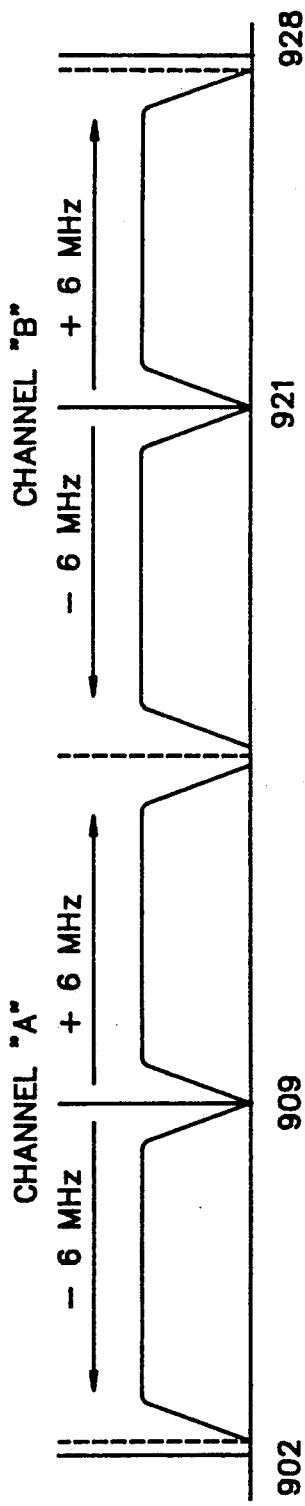
FIG. 19 is a simplified diagram of the preferred double sideband FM operation of the present invention which provides for "A" and "B" channels of 12 MHz total bandwidth each.

In like manner, a preferred configuration for a fully integrated TV set 20' is shown in a more detailed block diagram in FIG. 15. Again, there is a single power supply 112 and all the components are in a common case (not shown for simplicity). The adjustable, directional antenna 28' is connected to a first bandpass filter 128 for passing only the 902–928 MHz band preferred local broadcasting frequency. The output of the filter 128 is connected to a selectable tuner 130. The preferred configuration for the tuner 130 is a bi-selectable tuner having a switch 131 by means of which a selection between an "A" channel and a "B" channel can be made. The reason for this preferred embodiment can be seen with a brief digression to FIG. 19. The usual television "channel" occupies a bandwidth of 6 MHz (e.g. channel 5 occupies 76–82 MHz). Commercial television broadcasting equipment employs complicated and expensive so-called "single sideband" transmitting apparatus to accomplish this in order to get twice as much broadcasting capability in the same space. For the consumer-oriented equipment as wherein the present invention is directed, cost is a major factor in consumer acceptability. Thus, the single sideband approach is cost prohibitive and applicants contemplate that a full 12 HMz will be occupied by a single transmitting/receiving pair employing the present invention in its anticipated preferred configurations. Therefore, it si anticipated that there will be selectable "A" and "B" channels centered about 909 and 921 MHz, respectively. The use of the two channels, coupled with the FM video transmission that is unique to the present invention and the directional receiving antenna 28' is expected to provide wireless transmission of video signals which are of high quality, having a high signal to noise ratio, and very little, if any, local interference between neighboring systems.

Returning now to FIG. 15, the output of the selectable tuner 130 is connected to the FM demodulator 90 which produces the video and audio signals 78', 80' as before, which are connected, respectively, to video and audio drivers 102, 104, which, in turn, are connected to drive the monitor 106 and speaker 108. To provide reception for normal television signals, VHF and UHF tuners 132, 134 are connected between signal input 136 and the AM demodulator 82, which is also connected into the drivers 102, 104. The AM demodulator 82, it should be noted, includes all the necessary circuitry to produce pure audio and video signals as its output. A duplicate (to the one in the VCR 18') IR detector 36 is connected to preamplifier 72. The output of the preamplifier 72 is connected to a function control circuit 126' controlling the power supply 112, sound volume, etc. It is also connected through a second bandpass filter 138 and trap 124 to the antenna 28'.

Figure 24:
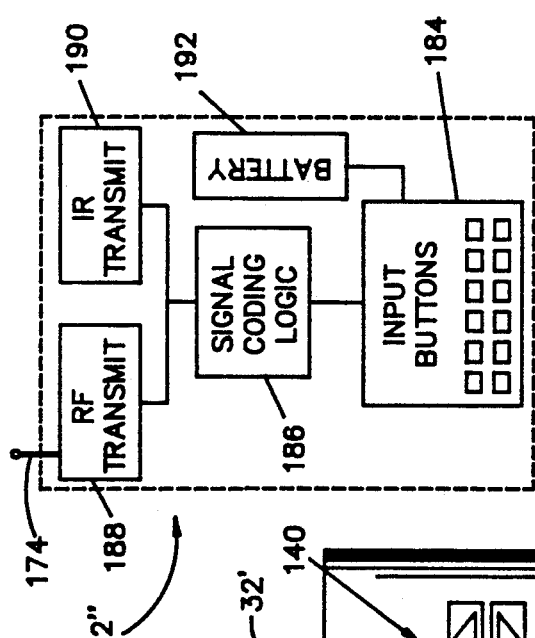
FIG. 24 is a simplified block diagram of the preferred dual mode controller of FIG. 16.
Figure 16:
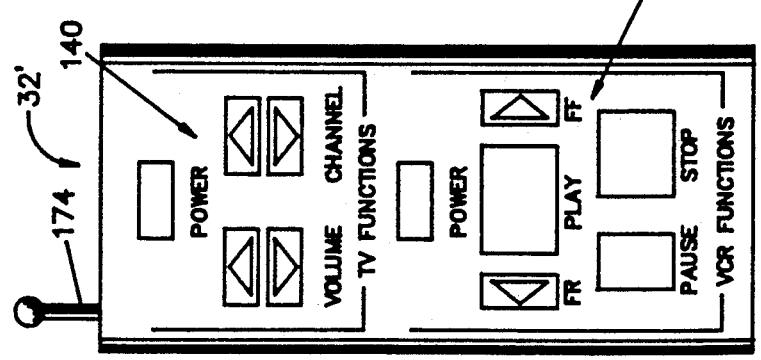
FIG. 16 is a drawing of a dual function infra red controller/transmitter according to a preferred embodiment of the present invention as employed with VCR/TV matched sets.

Turning now to FIG. 16, a preferred embodiment for the IR transmitting controller 32' when employed with the present invention in matched VCR/TV pairs is shown. Typically, one transmitting controller is sold with and used in conjunction with a VCR while another controller is sold with and used in conjunction with a TV set. Alternatively in the prior art, some devices share a common controller which has a switch thereon for switching it between functions. In the preferred embodiment of the present invention, a single multifunction controller 32' as shown in FIG. 16 provides all the necessary functions for use in either location (i.e. at the location of the VCR 18' or the location of the TV set 20') without the need for switching the controller to obtain different functions. A first set of buttons 140 control the TV functions while a second set of buttons 142 control the VCR functions. The coded signals from the controller 32' are unique to each of the buttons 140, 142 and the function control circuits 126, 126' within the devices include logic to recognize only those control signals applicable to the particular functions being controlled in that device. In one possible embodiment, the controller 32' transmits its coded signals simultaneously as IR and RF signals for reception by either type of system. The IR signals are transmitted out the end of the case in the usual manner while the RF signals are transmitted by a small antenna 174. Where desired, the functions of a cable select box could also be included in the universal controller 32' with, of course, unique codes being output for its functions as well. It is anticipated by applicants that in the presence of such commonality of components, the television industry will ultimately settle on a common interface signal convention for device control signals as employed in the present invention which will allow a single controller 32' from any manufacturer to be employed with all compatible devices. Such a device in its preferred embodiment is shown in block diagram form in FIG. 24. The controller 32" includes within a common case (as indicated by the dashed line) the input buttons 184 which input to signal coding logic 186 upon being depressed by a user. The signal coding logic 186, in turn, drives both an RF transmitter 188 and an IR transmitter 190 to output the unique coded signals associated with each of the bottons 184 and their assigned functions as both a coded RF signal and a coded IR signal so as to usable with either type of receiver on the associated devices being controlled. As usual for such controllers, a battery 192 is employed to provide the necessary power for both RF and IR transmission.

Figure 18:
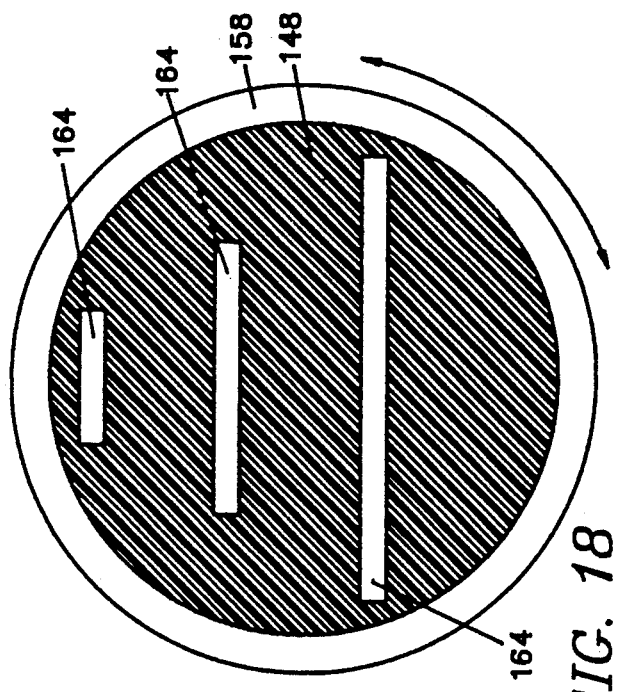
FIG. 18 is a view of the antenna of FIG. 17 in the plane XVIII-XVIII.
Figure 17:
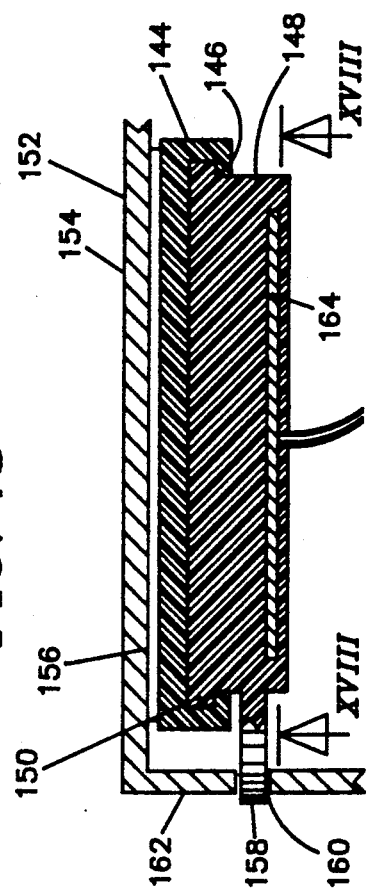
FIG. 17 is a cutaway side view of an adjustable directional antenna as might be employed for preferred operation of the present invention.

With regard to future TV sets 20' to be designed and built with the features of the present invention integrated therein, it will be recalled that it is has been stated as being preferred that the receiving antenna 28' be adjustable and directional. Such an antenna as envisioned by the applicants as being adaptable for incorporation into TV sets is shown in simplified form in FIG. 17 and 18. With respect to size, the preferred carrier frequency band of 902-928 MHz has a quarter wave length of approximately 3 inches. Thus, half wave length spacing of radiating element to provide directability to the antenna need only be in the order of 6 inches. The antenna 28' comprises a circular housing 144 having a peripheral retaining lip 146 about the upper outer edge. A disk-shaped inner member 148 is snapped into the housing 144 and retained there by an inner peripheral retaining ridge 150. The inner member 148 is free to rotate within the housing 144. Both the inner member 148 and the housing 144 are made of plastic. The housing 144 is adapted to be secured to the inside of the top 152 of the case 154 with double sided adhesive tape 156, or the like A thin circular adjusting lip 158 extends radially out from the side of the inner member 148 to pass through a slot 160 provided therefor in the side 162 of the case 154. By manually moving the lip 158 from outside of the case 154, the antenna 28' within the case 154 can be adjusted. The actual antenna active and passive elements comprise metal foil strips 164 embedded into (or adhesively attached onto) the plastic of the inner member 148. The configuration of the active and passive elements can be as desired to provide the desired characteristic according to techniques well known to those skilled in the art. The strips 164 are electrically connected to cable 22' by means of which the antenna 28' is connected to the appropriate circuitry as previously described herein.

Figure 20:
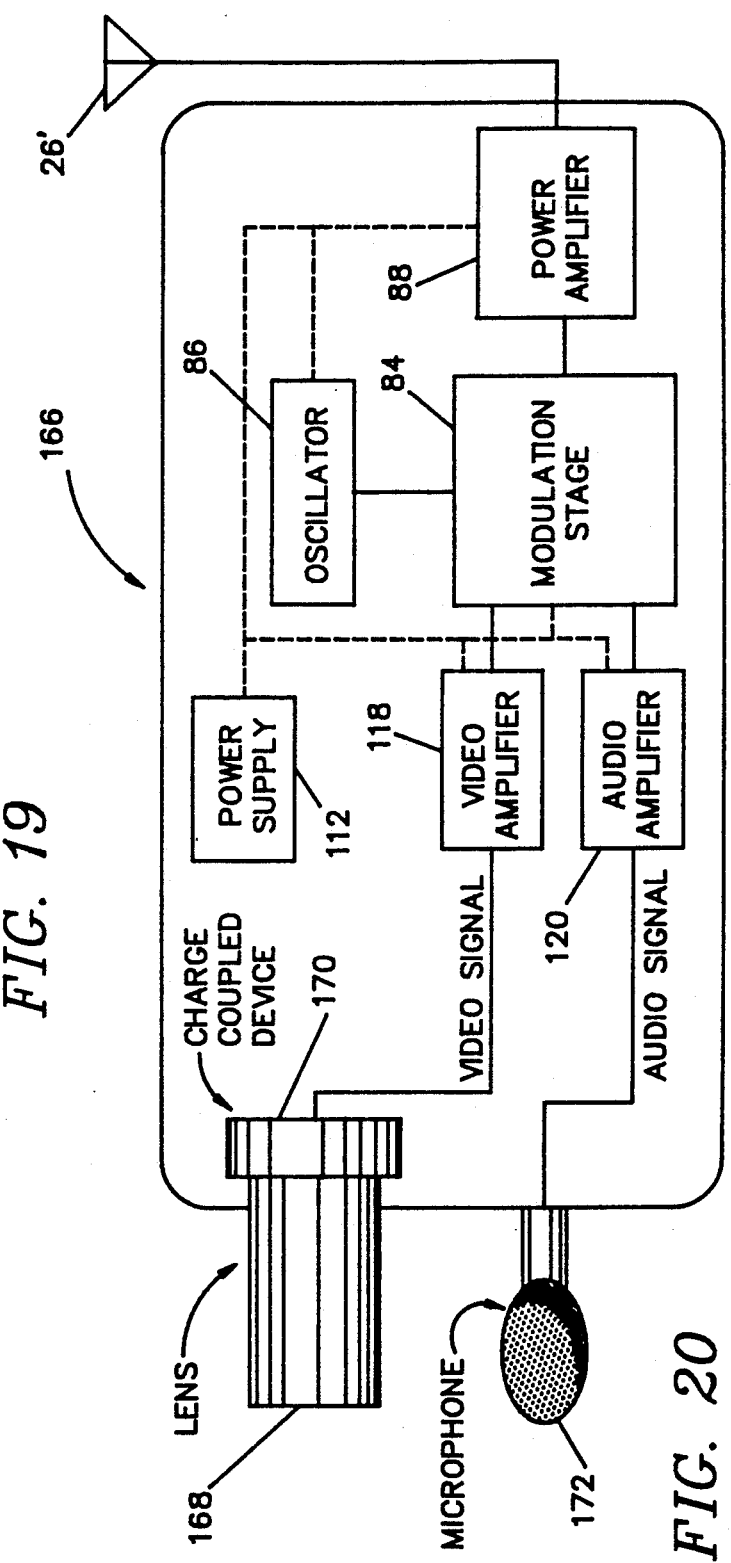
FIG. 20 is a simplified block diagram of a video camera constructed according to the present invention.
Figure 21:
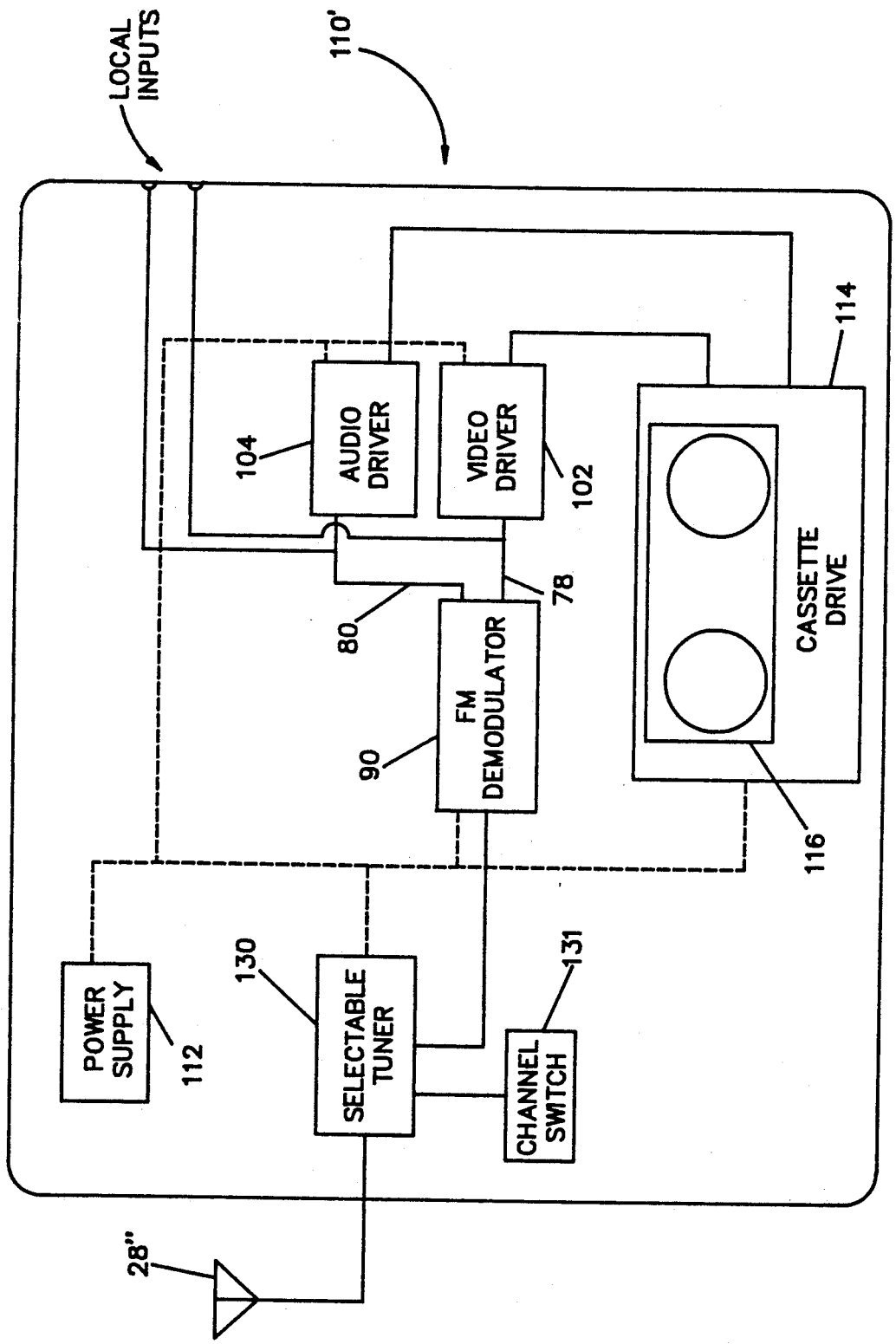
FIG. 21 is a simplified block diagram of a video recorder constructed according to the present invention for operation in conjunction with the camera of Figure 20.

A further aspect of the present invention is shown with reference to FIGS. 20 and 21. While the primary emphasis in the preceeding description and its accompanying drawings has been with respect to a transmitting VCR and a receiving TV set, the role of the VCR can be reversed and/or combined to advantage; that is, the VCR can also wirelessly receive signals to be recorded. In the normal real-time recording and/or display of video information, a video camera views the scene of interest and develops video and audio signals which are either recorded directly onto a cassette located within the camera or transmitted via co-axial cable to a remote location for recording and/or display. FIG. 20 shows a video camera 166 according to the present invention. The lens 168 focuses the image on a charge coupled device (CCD) 170 which outputs a video signal 78 as in devices previously described herein. Likewise, a microphone 172 produces the audio signal 80. The usual transmitting components according to the present invention as previously described are then used to broadcast the video/audio information to a remote site where the recording apparatus of FIG. 21 receives and uses it. A TV display in the manner of FIG. 15 could also be provided to receive and display the TV signals as transmitted, if desired. Such an approach could be used in commercial TV broadcasting facilities, for example, to allow producers, directors, etc. not physically located in the control room to view what the camera is shooting in real time. With particular respect to the receiving, integrated VCR recorder 110' of FIG. 21, the antenna 28" (probably best configured as an omni-directional antenna for this application) is connected to the selectable tuner 130 which, in turn, is connected to the FM demodulator 90 which produces the video and audio signals 78, 80 which are input to the video and audio drivers 102, 104 which are used to provide the inputs to the cassette drive 114 which contains the writing heads (not shown) by means of which the video/audio information is recorded on the cassette 116.

As those skilled in the art will instantly recognize, the playback VCR of FIG. 14 could be combined with the recording VCR of FIG. 21 to provide a fully integrated VCR which both broadcasts and receives signals wirelessly.

Figure 22:
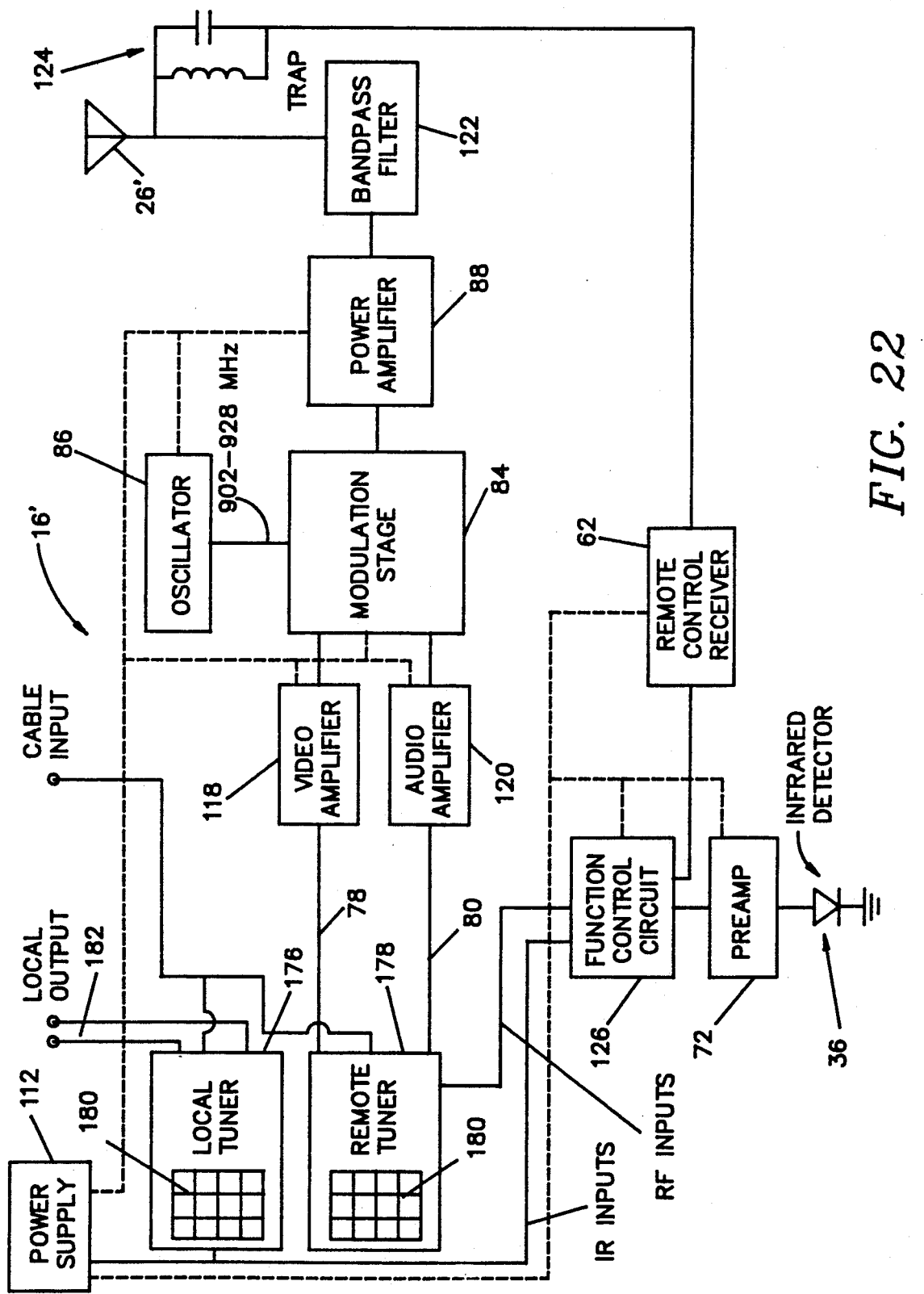
FIG. 22 is a simplified block diagram of a cable select box according to the present invention in a first embodiment containing two tuners and single channel wireless transmission.

Several further aspects of the present invention are shown with reference to FIGS. 22 and 23. As shown in FIG. 22, there is a cable select box 16' provided with two full channel tuners 176 and 178 each having a channel selector input panel 180 and incorporating pay channel unscrambling circuitry as appropriate. Tuner 176 is a local tuner and is connected through local output lines 182 to the audio and video inputs of a television set, VCR, or the like, located locally to the box 16' and connected thereto with cable or wire. Tuner 178 is a remote tuner and is connected to the video and audio amplifiers 118 and 120 as previously described to transmit its output wirelessly to a device at a remote location. Typically, the adults desire to watch one program while the children are watching another at a different location within a house. This arrangement allows a single cable select box to be used for the selection of different programs at two different locations in a house or the like. As will also be noted, the two tuners 176, 178 are independently connected to the function control circuit 126 and the remote control receiver 62 is independently connected to the function control circuit 126 from the preamplifier 72. In this manner, the tuners 176, 178 can be independently controlled from their respective watching locations.

An alternate arrangement is shown in the cable select box 16" of FIG. 23 wherein the tuners 176, 178 are both connected to transmit their signals wirelessly. Each tuner 176, 178 is connected to its own audio and video amplifiers 118, 120 and its own oscillator 86 and modulation stage 84. The modulation stages 84 both drive a common power amplifer 88, etc. for transmitting. One oscillator 86 operates at the channel "A" frequency while the other oscillator 86 operates at the channel "B" frequency so that the outputs of the tuners 176, 178 are separately receivable. While applicants envision most devices being connected by cable for true local connection and only transmitting wirelessly to remote locations where direct interconnection is impossible or inconvenient, the use of dual wireless transmitting capability in VCRs, and the like, as described with respect to the cable select box 16" of FIG. 23, is viewed as quite possible and practical in many instances.

Thus, it can be seen from the foregoing description and the various examples provided therein that the present invention is truly a multi-faceted invention covering a broad spectrum of the video art.

Wherefore, having thus described our invention, we claim:

1. In a television system including a source of a signal including a video portion modulated onto a first frequency from any of the standard UHF and VHF frequencies used for normal television broadcasting and a television monitor for displaying a video picture, the improvement for wirelessly locally transmitting the video portion of the signal from the source to the monitor comprising:
   a) first demodulating means disposed at the source and connected to receive the signal for demodulating the first frequency and for producing the video portion thereof as an output;
   b) oscillator means disposed at the source for generating a second frequency above any standard UHF and VHF frequencies used for normal television broadcasting;
   c) first modulating means disposed at the source for modulating said second frequency with the video portion of the signal to produce a modulated second frequency signal as an output thereof;
   d) amplifying and transmitting means connected to said output of said first modulating means for amplifying and transmitting said modulated second frequency signal from a transmitting antenna;
   e) receiving antenna means disposed at the monitor for receiving said modulated second frequency signal;
   f) second demodulating means connected to said antenna means for demodulating said modulated second frequency signal as received and for reproducing the video portion of the signal as an output; and,
   g) means interconnecting said output of said second demodulating means to the monitor for conducting the video portion of the signal to the monitor to be used thereby in producing a video picture.

2. The improvement to a television system of claim 1 wherein:
   said oscillator means generates said second frequency at a frequency above 900 MHz.

3. The improvement to a television system of claim 2 wherein:
   said oscillator means generates said second frequency in a band of 902-928 MHz.

4. A wireless local television transmission system comprising:
   a) a source of a video signal to be viewed at a remote location, said video signal being modulated onto a first frequency from any of the standard UHF and VHF frequencies used for normal television broadcasting;
   b) first demodulator and up converter means connected to said source for removing said video signal from said first frequency and modulating it onto a second frequency above any standard UHF and VHF frequencies used for assigned television channels;
   c) transmitter means including a transmitting antenna connected to said first demodulator and up converter means for transmitting said video signal modulated on said second frequency;

d) receiver means including a receiving antenna at said remote location for receiving said transmitted video signal modulated on said second frequency;

e) down converter means connected to said receiver means for removing said video signal from said second frequency and for modulating said video signal onto a third frequency within the normal television bands and identified with a known channel; and, f) television set means connected to said down converter means including second demodulator means for removing said video signal from said third frequency and for processing and displaying said video signal on said known channel.

5. The wireless local television transmission system of claim 4 wherein:
said up converter means shifts said video signal to a frequency band above 900 MHz.

6. The wireless local television transmission system of claim 1 wherein:
said up converter means shifts said video signal to a frequency band of 902-928 MHz.

7. The method of locally wirelessly transmitting a television video signal between a source producing the signal as a modulation on a first radio frequency carrier and a television set for use therein comprising the steps of:

a) demodulating the first radio frequency carrier to remove the video signal from the first radio frequency carrier;

b) modulating a second radio frequency carrier at a frequency above any standard UHF and VHF frequencies used for assigned television channels with the video signal;

c) wirelessly transmitting the modulated second radio frequency carrier to the location of the television set;

d) receiving and demodulating the second radio frequency carrier to remove the video signal from the second radio frequency carrier;

e) modulating a third radio frequency carrier with the video signal;

f) connecting the third radio frequency carrier to a signal input of the television set; and, g) receiving and demodulating the third radio frequency carrier within the television set to remove the video signal from the second radio frequency carrier.

* * * * *

REEXAMINATION CERTIFICATE (1837th)

United States Patent [19]

Streck et al.

[11] B1 5,023,931

[45] Certificate Issued  Nov. 3, 1992

[54] TELEVISION LOCAL WIRELESS TRANSMISSION AND CONTROL

[75] Inventors: Donald A. Streck, 832 Country Dr., Ojai, Calif. 93023; Jerry R. Iggulden, 21600 Cleardale St., Newhall, Calif. 91321

[73] Assignees: Donald A. Streck, Ojai; Jerry R. Iggulden, Newhall, both of Calif.

Reexamination Request:
No. 90/002,375, Jun. 24, 1991

Reexamination Certificate for:
Patent No.: 5,023,931
Issued: Jun. 11, 1991
Appl. No.: 457,843
Filed: Dec. 27, 1989

Related U.S. Application Data

[62] Division of Ser. No. 96,929, Sep. 15, 1987.

[51] Int. Cl.⁵ .............................................. H04N 7/00
[52] U.S. Cl. ....................................... 455/21; 455/66; 358/83; 358/335
[58] Field of Search .................... 455/9, 20, 21, 39, 49, 455/66, 67; 358/83, 86, 141, 186, 335

[56] References Cited

U.S. PATENT DOCUMENTS

| | | | |
|---|---|---|---|
| 2,831,105 | 4/1958 | Parker | 250/15 |
| 4,145,720 | 3/1979 | Weintraub | 358/194 |
| 4,685,133 | 8/1987 | Iggulden | 358/83 |
| 4,697,893 | 10/1987 | Camras | 358/83 |
| 4,739,413 | 4/1988 | Meyer | 358/141 |
| 4,771,344 | 9/1988 | Fallacaro et al. | 358/83 |
| 4,916,532 | 4/1990 | Streck et al. | 455/66 |

OTHER PUBLICATIONS

The IEEE Standard Dictionary of Electrical and Electronics Terms, Third Edition, 1984, p. 243.
Griffin, Ham-TV, A5 Magazine Sep. 1984, pp. 6-9.
PC Electronics, Advertisement, A5 Amateur Television Magazine, Sep. 1984, pp. 20-23.
Ruh, All About Amateur TV, QST Magazine, Jun., 1981, pp. 11-12.
Campbell, Amateur TV—The Easy Way, QST Magazine, Nov., 1962, pp. 33-41 and 150.
1981 Radio Amateur's Handbook, pp. 14-28 to 14-32.
SPEC-COM Journal, Sep.-Oct., 1985, p. 9.
Federal Register, vol. 50, pp. 33937 et seq., Aug. 22, 1985.
SAMS, Reference Data for Engineers, 7th Ed., 1985, pp. 1-5, 1-18 and 35-10 through 35-15.
Advertisement, SPEC-COM Journal, Sep./Oct., 1986, pp. 20-21.
Federal Communications Commission Public Notice, Report No. 1544, Oct. 21, 1985.

*Primary Examiner*—Reinhard Eisenzopf

[57] ABSTRACT

A wireless local television transmission system with related methods, apparatus, and components. There is a source of a video signal to be viewed at a remote location such as a TV camera, cable select box, antenna, or VCR. An up converter is connected to the source for shifting the video signal to a frequency above the normal television bands. A transmitter is connected to the up converter for transmitting the video signal at the shifted frequency. A receiver is disposed at the remote location for receiving the transmitted video signal. A down converter is connected to the receiver for shifting the video signal back down to a frequency within the normal television bands and identified with a known channel. Finally, conventional television set functions are connected to the down converter for processing and displaying the video signal on the known channel. The preferred up conversion shifts the video signal to a frequency in the band of 902-928 MHz and frequency modulates the video signal on a carrier within that band. Provision is also provided for the wireless transmission of control signals provided by a conventional infra red controller/transmitter so that the controller/transmitter can be used at the location of either the VCR or the television set. The preferred embodiment employs a single controller/transmitter for both VCR and television control. An improved cable select box is disclosed employing two tuners and wireless signal transmission. A wireless video camera/recorder system is also disclosed. The disclosure also includes a universal controller/transmitter transmitting IR and RF signals simultaneously as well as a directional antenna to be employed with receiving equipment to reduce interference.

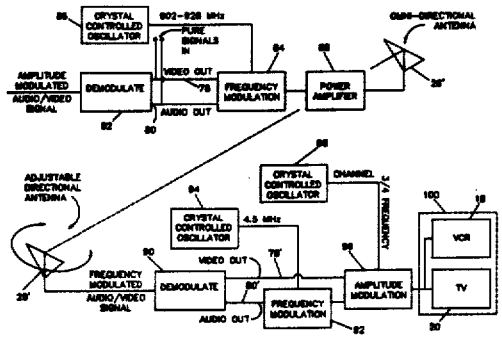

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-7 are cancelled.

* * * * *